US009602044B2

United States Patent
Fedigan

(10) Patent No.: US 9,602,044 B2
(45) Date of Patent: Mar. 21, 2017

(54) TRAVELLING WAVE MOTOR PRE-DRIVER USING HIGH RESOLUTION PWM GENERATORS

(71) Applicant: Texas Instruments Incorporated, Dallas, TX (US)

(72) Inventor: Stephen John Fedigan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 219 days.

(21) Appl. No.: 14/173,589

(22) Filed: Feb. 5, 2014

(65) Prior Publication Data

US 2015/0222217 A1 Aug. 6, 2015

(51) Int. Cl.
*H01L 41/04* (2006.01)
*H02P 31/00* (2006.01)
*H02P 27/08* (2006.01)

(52) U.S. Cl.
CPC .............. *H02P 31/00* (2013.01); *H02P 27/08* (2013.01)

(58) Field of Classification Search
CPC ........ H02N 2/026; H02N 2/103; H02N 2/004; H02N 2/126; H02N 2/008; H02N 2/04; H02N 2/106; H02N 2/0025; H02N 2/007; H02N 2/067; H02N 2/08; H02N 2/108; H02N 2/163; H02N 2/166; H02N 2/0045
(Continued)

(56) References Cited

U.S. PATENT DOCUMENTS

| 5,198,732 | A | * | 3/1993 | Morimoto | .............. | H02N 2/142 |
| | | | | | | 310/316.02 |
| 6,288,473 | B1 | * | 9/2001 | Mittas | .................... | H02N 2/147 |
| | | | | | | 310/317 |

(Continued)

OTHER PUBLICATIONS

Erdal Bekiroglu, "Microcontroller-based full control of ultrasonic motor with frequency and voltage adjusting", Science Direct, Elsevier, Sensors and Actuators, A 141, 2008, pp. 151-159.
(Continued)

*Primary Examiner* — Eduardo Colon Santana
*Assistant Examiner* — Gabriel Agared
(74) *Attorney, Agent, or Firm* — John R. Pessetto; Charles A. Brill; Frank D. Cimino

(57) ABSTRACT

A motor driver combination for controlling a travelling wave motor includes a pre-driver including a microcontroller unit (MCU) chip including a plurality of high-resolution pulse width modulation (HRPWM) generators providing a frequency resolution better than ten Hz. A digital bus is for transferring digital words received from a controller in a servo and velocity control block to the HRPWM generators, where the digital words provide travelling wave motor operating performance information from the motor during its operation. A clock oscillator providing an accuracy of at least eighty (80) parts per million (ppm) is coupled to or provided by the MCU chip for each of the high-resolution PWM generators. A motor driver includes a plurality of power drivers for providing phased outputs for driving the travelling wave motor including a plurality of inputs coupled to outputs of the plurality of HRPWM generators. The travelling wave motor can be an ultrasonic motor.

14 Claims, 2 Drawing Sheets

(58) Field of Classification Search
USPC .......................................................... 318/116
See application file for complete search history.

(56) References Cited

U.S. PATENT DOCUMENTS

| | | | |
|---|---|---|---|
| 6,611,117 | B1 | 8/2003 | Hardt |
| 6,687,590 | B2 | 2/2004 | Kifuku et al. |
| 2005/0030206 | A1* | 2/2005 | Li .............................. H03K 7/08 341/53 |
| 2007/0248337 | A1* | 10/2007 | Ling ....................... H02P 6/001 388/811 |

OTHER PUBLICATIONS

Yuji Izuno, et al., "Software-Based Adjusting P-I Gain Controller for Speed-Tracking Servo System Using Traveling-Wave Type Ultrasonic Motor", Industry Applications Society Annual Meeting, Oct. 2-6, 1994, vol. 3, pp. 1777-1784.

Shin-Ichi Furuya, et al., "Load-Adaptive Frequency Tracking Control Implementation of Two-Phase Resonant Inverter for Ultrasonic Motor", IEEE Transactions on Power Electronics, vol. 7, No. 3, Jul. 1992, pp. 542-550.

Tomonobu Senjyu, et al., "Performance Comparison of PI and Adaptive Controller for Adjustable Speed Drives of Ultrasonic Motors", Proceedings of the IEEE International Conference on Industrial Technology, Dec. 5-9, 1994, pp. 519-523.

Tomonobu Senjyu, et al., "Adjustable Speed Control of Ultrasonic Motors by Adaptive Control", IEEE Transactions on Power Electronics, vol. 10, No. 3, Sep. 1995, pp. 532-538.

Gungor Bal, et al., "A Highly Effective Load Adaptive Servo Drive System for Speed Control of Travelling-Wave Ultrasonic Motor", IEEE Transactions on Power Electronics, vol. 20, No. 5, Sep. 2005, pp. 1143-1149.

Jingzhuo Shi, et al., "Optimum Efficiency Control of Traveling-Wave Ultrasonic Motor System", IEEE Transactions on Industrial Electronics, vol. 58, No. 10, Oct. 2011, pp. 4822-4829.

* cited by examiner

TRAVELLING WAVE MOTOR PRE-DRIVER USING HIGH RESOLUTION PWM GENERATORS

FIELD

Disclosed embodiments relate to motor pre-drivers for travelling wave motors including ultrasonic motors.

BACKGROUND

An ultrasonic motor (USM) is a motor with a piezoelectric (e.g., lead zirconium titanate (PZT)) actuator operating in the ultrasonic range above the audible band (about 20 kHz) so that it moves silently to humans. A single piezoelectric strip with two partitions is bonded on the bottom to stator. The two partitions are separated by a quarter wavelength spatially and are excited by signals 90 degrees out of phase. A preload applied between stator and rotor converts high frequency, low amplitude vibrations to unidirectional motion via frictional coupling. To amplify motion, the PZT or other piezoelectric element typically excites a system resonance of the USM.

USM's generally include a driver that supplies two high voltage waveforms in quadrature at a frequency above the audible band. This frequency is typically adjusted within a narrow range just above the series resonance frequency in very fine steps. For example, one particular USM may have a series resonance frequency of 61.6 KHz which needs a frequency resolution ($\Delta f$) of 5 Hz or better in its application. This translates into a frequency step of about 0.08%. The USM torque when operating above the series resonance frequency is known to vary more smoothly and linearly than below the resonance frequency. Below the resonance frequency, where it drops off precipitously to control the USM below the resonance frequency, one would need even more frequency resolution. Hence, there is a need to adjust the frequency of the motor just above the series resonance frequency.

This needed frequency resolution ($\Delta f$) presents a problem for conventional pulse-width modulation (PWM) generators which develop their PWM output frequency using a divide-by-N clock circuit. For these circuits, $\Delta f$ is given by:

$$\Delta f = \frac{f_{pwm}^2}{f_{clock}}$$

$f_{pwm}$ = PWM output frequency $f_{clock}$ = Clock frequency

In this example, obtaining a 5 Hz resolution for a 61.2 kHz PWM output frequency requires a clock frequency ($f_{clock}$) of 720 MHz, which is beyond the capability of low-cost microcontroller units (MCU's).

Conventionally, to solve this problem to provide the needed frequency resolution for the USM, for example $\Delta f=5$ Hz, USM motor driver boards use a digital to analog converter (DAC) that receives a signal from the motor sensed by a servo and velocity control block, followed by a voltage controlled oscillator (VCO) to develop the desired motor driver frequency. The VCO in turn feeds a ring counter to generate quadraphase PWM outputs with respective phase delays of 0, 90, 180, and 270 degrees. These quadraphase PWM outputs are commonly connected to two push-pull power drivers of the motor driver circuit that is coupled to drive the USM.

This conventional solution to the frequency resolution for USM's problem is expensive, requiring at least 3 external components (DAC, VCO, and a ring counter). The frequency resolution achievable for this known arrangement depends on the VCO sensitivity and the number of bits in the DAC.

SUMMARY

Disclosed embodiments solve the above-described frequency resolution problem by using the micro-edge positioning (MEP) technology provided by high-resolution pulse width modulation (HRPWM) generators embedded in certain microcontroller units (MCUs), so that the frequency resolution of the motor pre-driver can be significantly enhanced as compared to the frequency generated using conventional divide by N clock circuits. One example MCU having embedded HRPWM generators is the Texas Instrument Incorporated (TI) C2000™ which has eight (8) HRPWM generators. A HRPWM generator as used herein refers to a PWM generator that provides a frequency resolution at 25° C. better than (<) 10 Hz for PWM carrier frequencies between 5 kHz and 300 kHz.

One particular embodiment utilizes four HRPWM generators on the MCU fed by the same clock. The HRPWM generators have essentially identical output frequencies (being driven by the same clock), and each have a 25% duty cycle. Their quadrature phases are 0, 180, 90, 270 degrees from top to bottom, respectively. Disclosed embodiments recognize the only need for providing a high PWM frequency resolution (e.g., ≥ of 5 Hz) is that the clock for the MCU provides an accuracy of at least eighty (80) parts per million (ppm), such as available from certain crystal oscillator clocks, which can be either on or off the MCU chip. Disclosed embodiments thus replace the digital to analog converter (DAC), voltage controlled oscillator (VCO) and ring counter described above with a MCU, which can reduce the cost and increase the reliability and performance of the travelling wave motor control system, such as an ultrasonic motor (USM) control system.

BRIEF DESCRIPTION OF THE DRAWINGS

Reference will now be made to the accompanying drawings, which are not necessarily drawn to scale, wherein.

DETAILED DESCRIPTION

Figure 1:
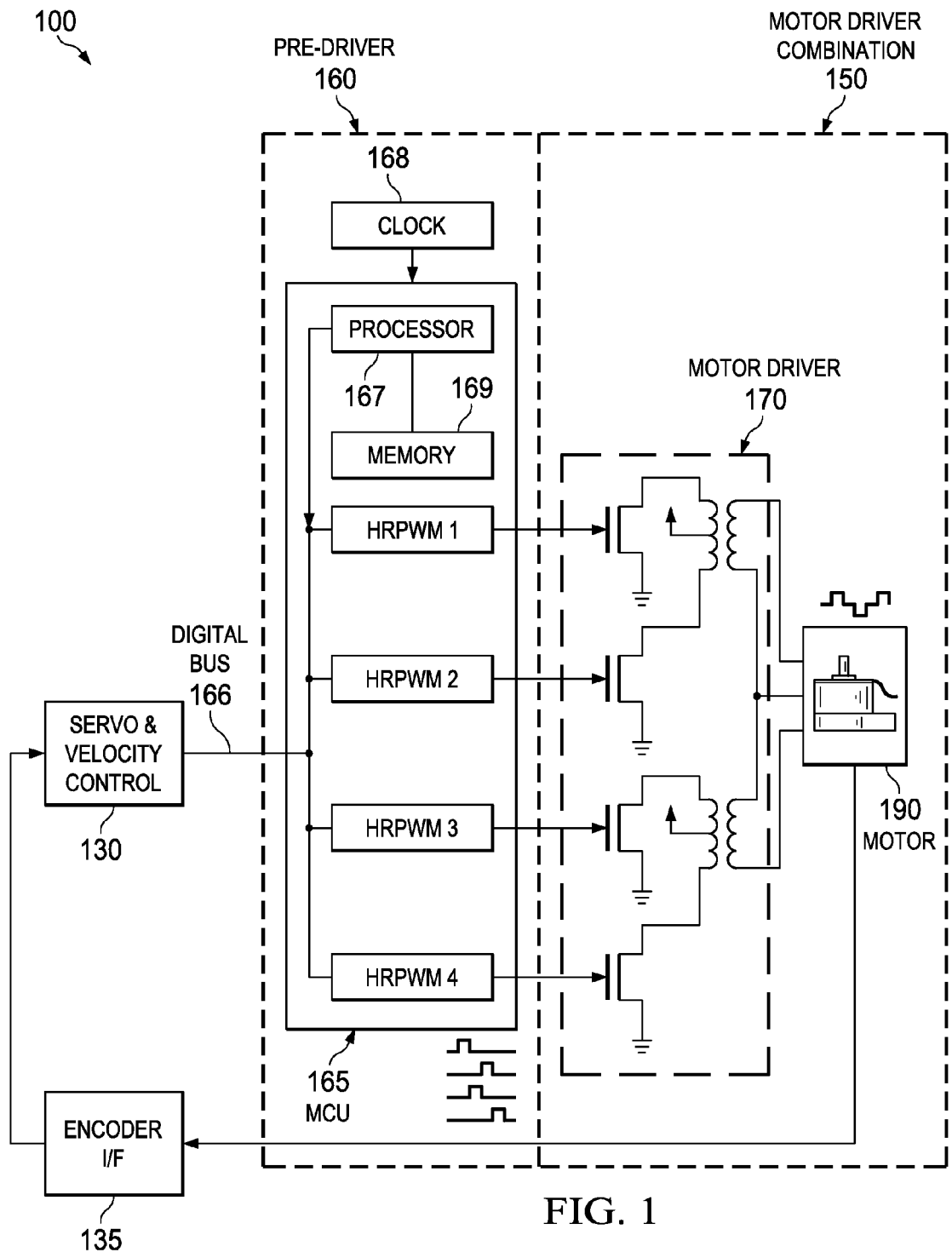
FIG. 1 is a block diagram of a travelling wave motor control system including a motor driver combination including a disclosed MCU-based pre-driver and a push-pull topology motor driver for controlling the speed and position of a travelling wave motor, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a block diagram of a travelling wave motor control system 100 including a motor driver combination for controlling operation (start, stop, speed and position) of a travelling wave motor 190, according to an example embodiment. The motor driver combination 150 includes a disclosed pre-driver 160 including a MCU chip 165 having a plurality of HRPWMs and a motor driver circuit 170.

Pre-driver 160 includes a MCU chip 165 shown including a processor 167, memory 169 and a plurality of HRPWM generators shown as HRPWM 1, HRPWM 2, HRPWM 3 and HRPWM 4 each providing micro-edge positioning (MEP). As noted above, the MCU 165 can be the C2000™ from Texas Instruments Incorporated, assignee of this patent application, which includes 8 HRPWM generators.

MCU 165 also includes a digital bus 166 for transferring digital words (which represent frequency) received from a controller in a servo and velocity control block 130 to the plurality of HRPWM generators (HRPWM 1, HRPWM 2, HRPWM 3 and HRPWM 4), where the digital words provide operating performance information from the travelling wave motor 190 during operation of the motor, such as from an optical encoder shown as encoder I/F 135 in FIG. 1 to implement servo control. Alternatively, for velocity control instead of servo control, Hall effect sensors can be used.

Figure 2:
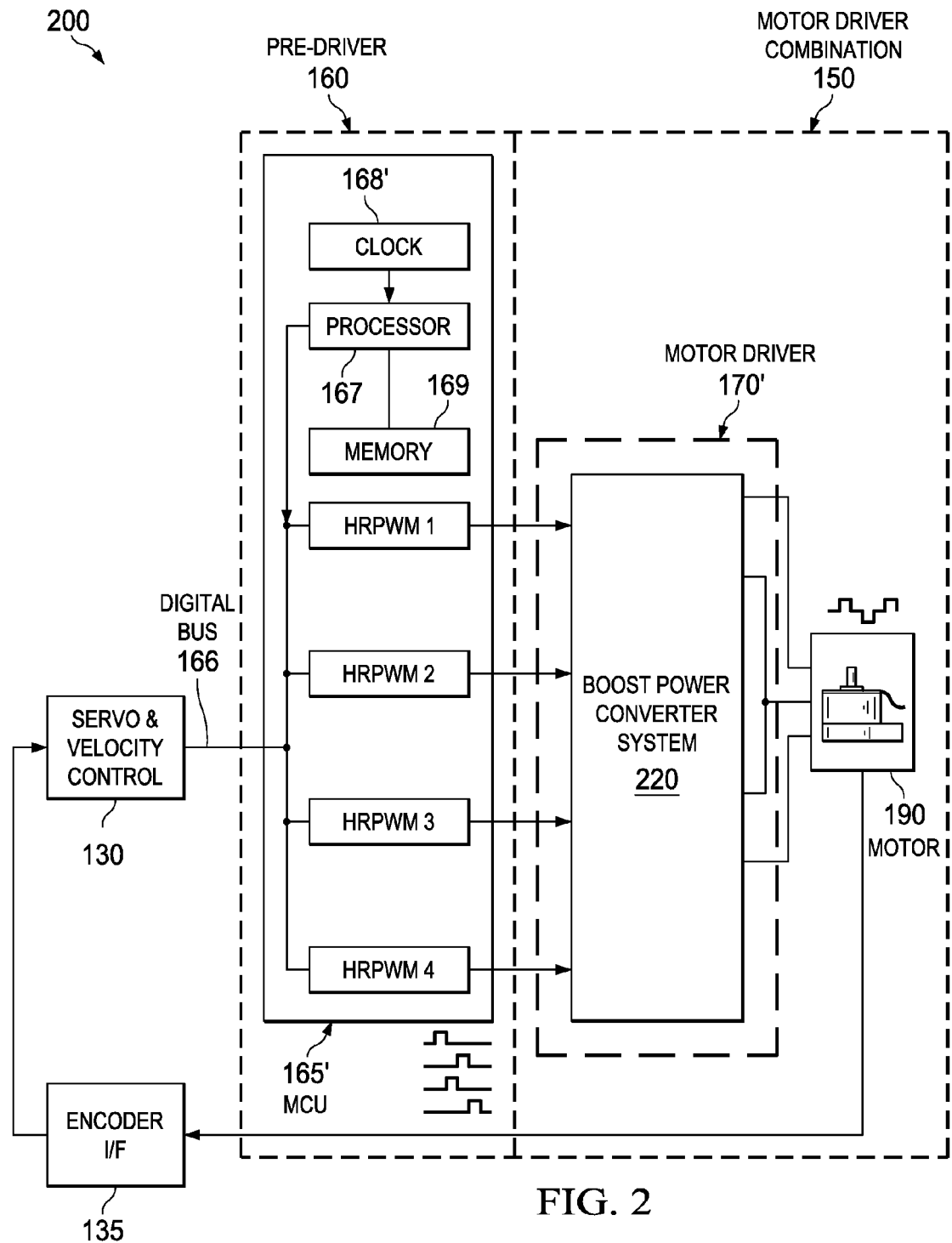
FIG. 2 is a block diagram of another travelling wave motor control system including a motor driver combination including a disclosed MCU-based pre-driver having a boost converter system for controlling the speed and position of a travelling wave motor, according to an example embodiment.

Pre-driver 160 also includes a clock oscillator 168 shown as "clock" providing an accuracy of at least eighty (80) parts per million (ppm) shown separate from and coupled to the MCU chip 165 for providing timing information for each of the HRPWM generators (HRPWM 1, HRPWM 2, HRPWM 3 and HRPWM 4). The clock oscillator 168 can comprise a crystal oscillator, or include other clock oscillator circuitry having features for tracking (compensation) of temperature variations with frequency. As shown in FIG. 2 described below, the MCU chip 165 can include its own crystal clock oscillator, which can provide an accurate crystal oscillator integrated on the MCU chip 165.

The motor driver circuit 170 shown includes a plurality of power drivers for providing phased outputs for driving the travelling wave motor 190 including a plurality of inputs coupled to outputs of the plurality of HRPWM generators (HRPWM 1, HRPWM 2, HRPWM 3 and HRPWM 4). The motor driver circuit 170 shown in FIG. 1 comprises two push-pull power drivers. However, as described relative to FIG. 2, disclosed embodiments may include other motor driver arrangements, such as a pair of boost converters comprising a half bridge or full bridge circuit and an LC or LLCC filter to eliminate the transformers of the push-pull topology shown in FIG. 1 (see FIG. 2 described below). Although the above described MCU-based pre-driver 160 described above for a traveling wave motor generally operating at 5 kHz to 350 kHz, such as an ultrasonic motor defined herein to operate at 20 kHz to 300 kHz, disclosed MCU-based pre-drivers may also be applicable to other types of motors and actuators. For example, a piezoelectric actuator.

FIG. 2 is a block diagram of another travelling wave motor control system 200 including a motor driver combination for controlling a travelling wave motor, according to an example embodiment. Motor control system 200 is analogous to motor control system 100 shown in FIG. 1 except it replaces the push-pull motor and transformer drive topology in the motor driver circuit 170 with a motor driver circuit 170' having a boost power converter system 220. As used herein, a "boost power converter system" refers the combination of a boost power converter(s), a full or a half bridge driver, and a filter. Boost power converter system 220 generally comprises a pair of boost converters (to provide positive and negative voltages) together with a full or half bridge, and an LC (LC resonant converter) or LLCC filter (LLCC resonant converter). The C can be that of a piezoelectric element. Boost power converter system 220 thus eliminates transformers, such as the transformers in motor driver 170 shown in FIG. 1 described above.

As known in the art of power electronics, a boost converter (or step-up converter) is a DC-to-DC power converter with an output voltage greater than its input voltage that is in a class of switched-mode power supply (SMPS) containing at least two semiconductor switches (a diode and a transistor), and at least one inductor. The boost power converter system 220 also enables the MCU chip shown as 165' to be configured to boost voltage with error and uses the phase as a secondary control variable as phase adjustment to allow the torque curve to be linearized. Phase modulation can thus be used to improve the torque linearity, extending the low end of the travelling wave motor's operating speed range. The clock in FIG. 2 is also shown as being an on-chip clock 168'.

A variety of other features may be added to disclosed motor driver combinations. For example, the MCU 165' can be programmed (by executable programs stored in the memory 169) to provide a resonance tracker to improve power efficiency. The motor driver 170' can also be a class AB amplifier which may increase lifespan of the motor 190. Sensorless control may also be implemented.

Advantages of disclosed embodiments include with the capacitive delay line in this peripheral, 8 more effective bits can be added to the frequency resolution provided to the traveling wave motor. In the motor example described above, the frequency resolution can be reduced to about 4 Hz with a 90 MHz clock, exceeding the requirements of the USM (or other motor) under test and saving the cost of the conventional pre-driver circuit arrangement described above being a DAC, VCO, and ring counter (3 separate components).

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A motor driver combination for controlling a an ultrasonic motor, comprising:
  an ultrasonic motor pre-driver including:
    a microcontroller unit (MCU) chip including a memory, a plurality of high-resolution pulse width modulation (HRPWM) generators providing a frequency resolution better than ten (10) Hz for pulse width modulation (PWM) carrier frequencies between 5 kHz and 300 kHz, a digital bus for transferring digital words received from a controller in a servo and velocity control block to the plurality of HRPWM generators, the digital words providing the ultrasonic motor operating performance information from the ultrasonic motor during its operation, wherein each HRPWM generator in the plurality of HRPWM generators provides micro-edge positioning;

a clock oscillator providing an accuracy of at least eighty (80) parts per million (ppm) coupled to or provided by said MCU chip for each of the HRPWM generators; and a motor driver including a plurality of power drivers for providing phased outputs for driving the ultrasonic wave motor including a plurality of inputs coupled to outputs of the plurality of HRPWM generators.

2. The motor driver combination of claim 1, wherein the clock oscillator comprises a crystal clock oscillator.

3. The motor driver combination of claim 2, wherein the crystal clock oscillator is on said MCU chip.

4. The motor driver combination of claim 1, wherein the motor driver comprises two (2) push-pull power drivers.

5. The motor driver combination of claim 1, wherein the motor driver comprises a boost power converter system.

6. The motor driver combination of claim 5, wherein the MCU chip is configured to boost voltage with error and use phase as a secondary control variable.

7. The motor driver combination of claim 1, wherein the MCU chip includes an executable program which implements a resonance tracker to improve power efficiency of the ultrasonic motor.

8. An ultrasonic motor control system, comprising:
an ultrasonic motor;
an ultrasonic motor pre-driver including:
a microcontroller unit (MCU) chip including a memory, a plurality of high-resolution pulse width modulation (HRPWM) generators providing a frequency resolution better than ten (10) Hz for pulse width modulation (PWM) carrier frequencies between 5 kHz and 300 kHz, a digital bus for transferring digital words received from a controller in a servo and velocity control block to the plurality of HRPWM generators, the digital words providing ultrasonic motor operating performance information from the ultrasonic motor during its operation, wherein each HRPWM generator in the plurality of HRPWM generators provides micro-edge positioning;

a clock oscillator providing an accuracy of at least eighty (80) parts per million (ppm) coupled to or provided by said MCU chip for each of the HRPWM generators; and a motor driver including a plurality of power drivers for providing phased outputs for driving the ultrasonic motor including a plurality of inputs coupled to outputs of the plurality of HRPWM generators, and a feedback path from an output of the ultrasonic motor to the MCU chip including a servo and velocity control block.

9. The system of claim 8, wherein the clock oscillator comprises crystal clock oscillator.

10. The system of claim 9, wherein the crystal clock oscillator is on said MCU chip.

11. The system of claim 8, wherein the motor driver comprises two push-pull power drivers.

12. The system of claim 8, wherein the motor driver comprises a boost power converter system.

13. The system of claim 12, wherein the MCU chip is configured to boost voltage with error and use phase as a secondary control variable.

14. The system of claim 8, wherein the MCU chip includes an executable program which implements a resonance tracker.

* * * * *